US006973723B2

(12) United States Patent
Cagney et al.

(10) Patent No.: US 6,973,723 B2
(45) Date of Patent: Dec. 13, 2005

(54) PISTON FORMED BY POWDER METALLURGICAL METHODS

(75) Inventors: John L. Cagney, Downers Grove, IL (US); Valeri B. Petrov, Elmhurst, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 31 days.

(21) Appl. No.: 10/338,500

(22) Filed: Jan. 8, 2003

(65) Prior Publication Data

US 2004/0129134 A1 Jul. 8, 2004

(51) Int. Cl.[7] .......................... B23P 15/00; F01B 31/08

(52) U.S. Cl. ............................ 29/888.047; 29/888.04; 29/888.042; 29/888.044; 29/888.05; 419/6; 92/186; 92/187

(58) Field of Search .................... 29/888.042, 886.047, 29/888.05; 419/6; 92/187, 186

(56) References Cited

U.S. PATENT DOCUMENTS

| | | | | |
|---|---|---|---|---|
| 4,419,413 | A * | 12/1983 | Ebihara | 428/548 |
| 5,972,071 | A | 10/1999 | Koike et al. | |
| 6,070,323 | A | 6/2000 | Koike et al. | |
| 6,279,455 | B1 | 8/2001 | Kruse | |
| 6,318,243 | B1 * | 11/2001 | Jones | 92/189 |
| 6,363,608 | B1 * | 4/2002 | Koike et al. | 29/888.04 |
| 6,435,077 | B1 | 8/2002 | Damour et al. | |
| 6,477,941 | B1 * | 11/2002 | Zhu et al. | 92/186 |
| 6,626,576 | B1 * | 9/2003 | Cadle et al. | 384/273 |
| 6,825,450 | B2 * | 11/2004 | Ribeiro et al. | 219/635 |

FOREIGN PATENT DOCUMENTS

| | | | |
|---|---|---|---|
| DE | 3305879 | * | 8/1984 |
| DE | 4307560 | * | 9/1994 |
| GB | 2070068 | * | 9/1981 |
| JP | 06-330106 | * | 11/1994 |
| JP | 2001-335814 | * | 12/2001 |
| JP | 2002-130048 | * | 5/2002 |

OTHER PUBLICATIONS

JPO Machine Translation of JP 06-330106, 1994. JPO.*
Kemnitz et al; "Monotherm, a New Forged Steel Piston Design for Highly Loaded Diesel Engines," SAE Technical Paper Series 2000-01-0924, Mar. 6-9, 2000.

* cited by examiner

*Primary Examiner*—Eric Compton
(74) *Attorney, Agent, or Firm*—Dennis Kelly Sullivan; Susan L. Lukasik; Jeffrey P. Calfa

(57) ABSTRACT

A piston includes a piston structure being unitarily formed in a powder metallurgy process, the piston structure having a crown assembly and a skirt assembly, at least a partial combustion chamber being formed intersecting a piston crown surface during the powder metallurgy process, the skirt assembly depending from the crown assembly and having two spaced apart pin bosses, each pin boss having a pin bore defined therein, a pair of opposed semi-circular skirt members, each skirt member extending outwardly from and being integrally joined to both of the pin bosses. The piston may be formed by executing a powder metallurgy process on at least two different metallic constituents to define a non-homogenous piston structure. A method of forming a piston is further included.

7 Claims, 13 Drawing Sheets

PISTON FORMED BY POWDER METALLURGICAL METHODS

FIELD OF THE INVENTION

The present invention relates to components formed by powder metallurgy and, more specifically, to a method and apparatus for forming a piston by powder metallurgy.

BACKGROUND OF THE INVENTION

Powder metallurgy is a common manufacturing process used to produce components of high quality for applications, including vehicular engines. Powder metallurgy is often employed in the manufacture of engine components because it is economical, flexible and can produce a finished part that requires much less machining or secondary processing than other methods of forming components. Powder metallurgy allows for a component to be formed of a wide variety of alloys, composites, and other materials to provide the finished component with desirable characteristics. Moreover, powder metallurgy allows the porosity of a part to be controlled for lubricant impregnation. Powder metallurgy is well suited to manufacture parts of a wide range of sizes and shapes. Also, powder metallurgy can reliably produce parts with consistent dimensions and advantageous physical properties.

The powder metallurgy manufacturing process is often employed to form engine components. However, no examples of a piston, formed homogeneously or non-homogeneously, by a powder metallurgy forging process are known. Such a piston would provide substantial benefits in the industry over the present forged steel and cast aluminum pistons.

The art of making pistons is old and crowded. Nonetheless, considerable inventive effort continues to the present in order to form pistons having advantageous characteristics. A recent example is U.S. Pat. No. 6,435,077, issued Aug. 20, 2002, to Damour et al. The Damour reference discloses an integral, unitary piston wherein the pin bosses are carefully formed in order to permit a working tool to be inserted between the two bosses in order to form a relatively large cavity beneath the center post of the combustion chamber formed in the crown of the piston. It would be advantageous to form a piston that minimized the amount of machining that was necessary subsequent to initial formation of the piston in order to achieve the desired shape.

A second recent example of piston technology found in U.S. Pat. No. 6,279,455, issued Aug. 28, 2001, to Kruse. The Kruse reference discloses a piston in which the crown has an upper portion and a lower portion formed separately and then joined along specific faces to form a two piece crown of the piston. It would be advantageous to form a suitable piston in a single operation to minimize the complexity of suitably joining two portions of the crown and yet achieve a satisfactory piston structure.

SUMMARY OF THE INVENTION

The present invention substantially meets the aforementioned needs of the industry. A piston formed by the process of the present invention is unitary and integral, formed of a single operation. Particular attention has been paid to certain bends and radii in the undercrown region that make the piston more forgeable. Additionally, significantly less material is utilized in the process compared with a traditional forging. It should be noted that a bowl forming at least a partial combustion chamber in the crown of the piston may be formed during the powder metallurgy forging process of the piston. The combustion chamber bowl may include valve pockets in the forging.

The present invention is a piston including a piston structure being unitarily formed in a powder metallurgy process, the piston structure having a crown assembly and a skirt assembly, at least a partial combustion chamber being formed intersecting a piston crown surface during the powder metallurgy process, the skirt assembly depending from the crown assembly and having two spaced apart pin bosses, each pin boss having a pin bore defined therein, a pair of opposed semi-circular skirt members, each skirt member extending outwardly from and being integrally joined to both of the pin bosses. The piston may be formed by executing a powder metallurgy process on at least two different metallic constituents to define a non-homogenous piston structure. A method of forming a piston is a further aspect of the present invention.

DETAILED DESCRIPTION OF THE DRAWINGS

Figure 1:
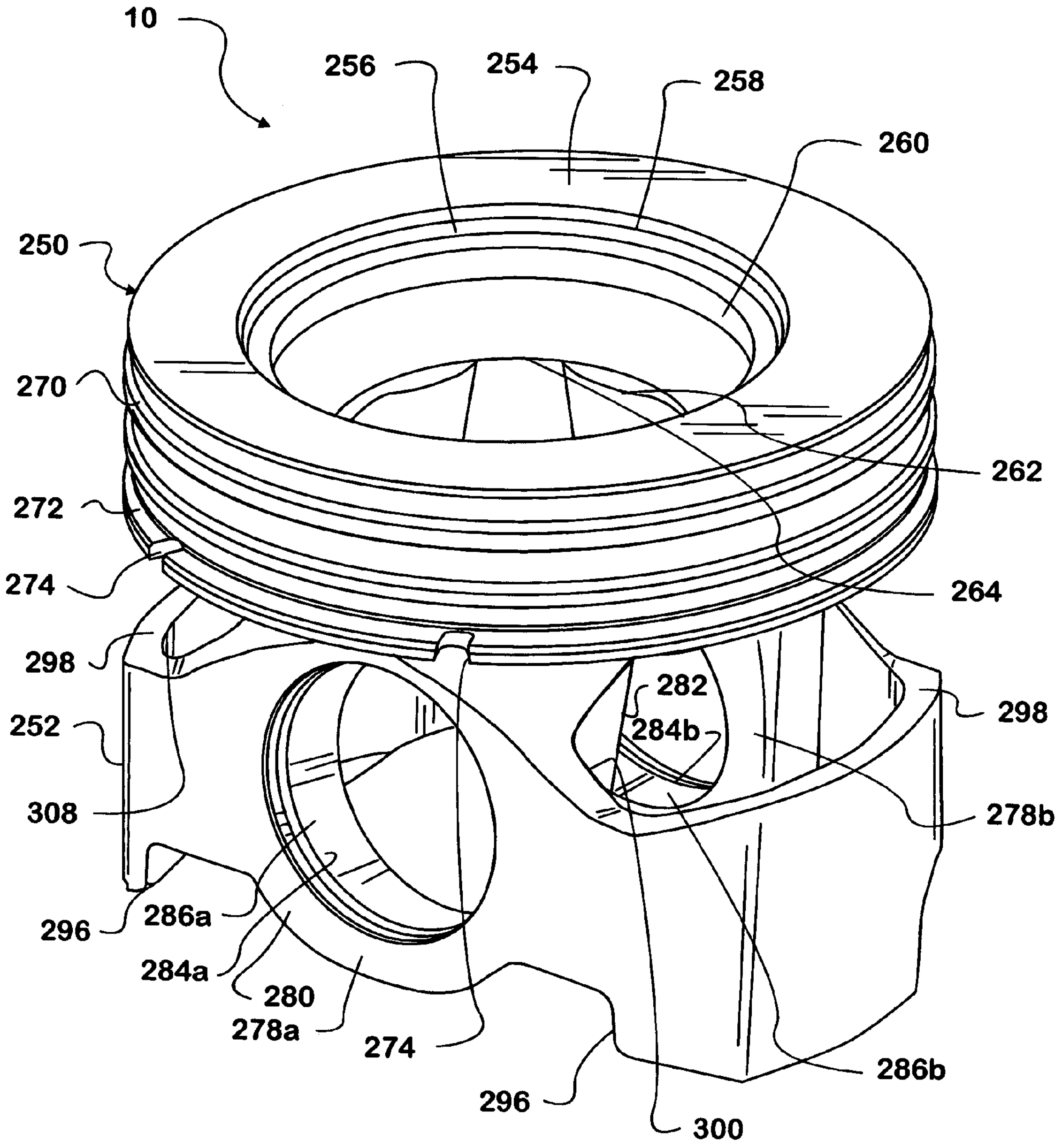
FIG. 1 is a perspective side view of a piston made in accordance with the present invention.
Figure 2:
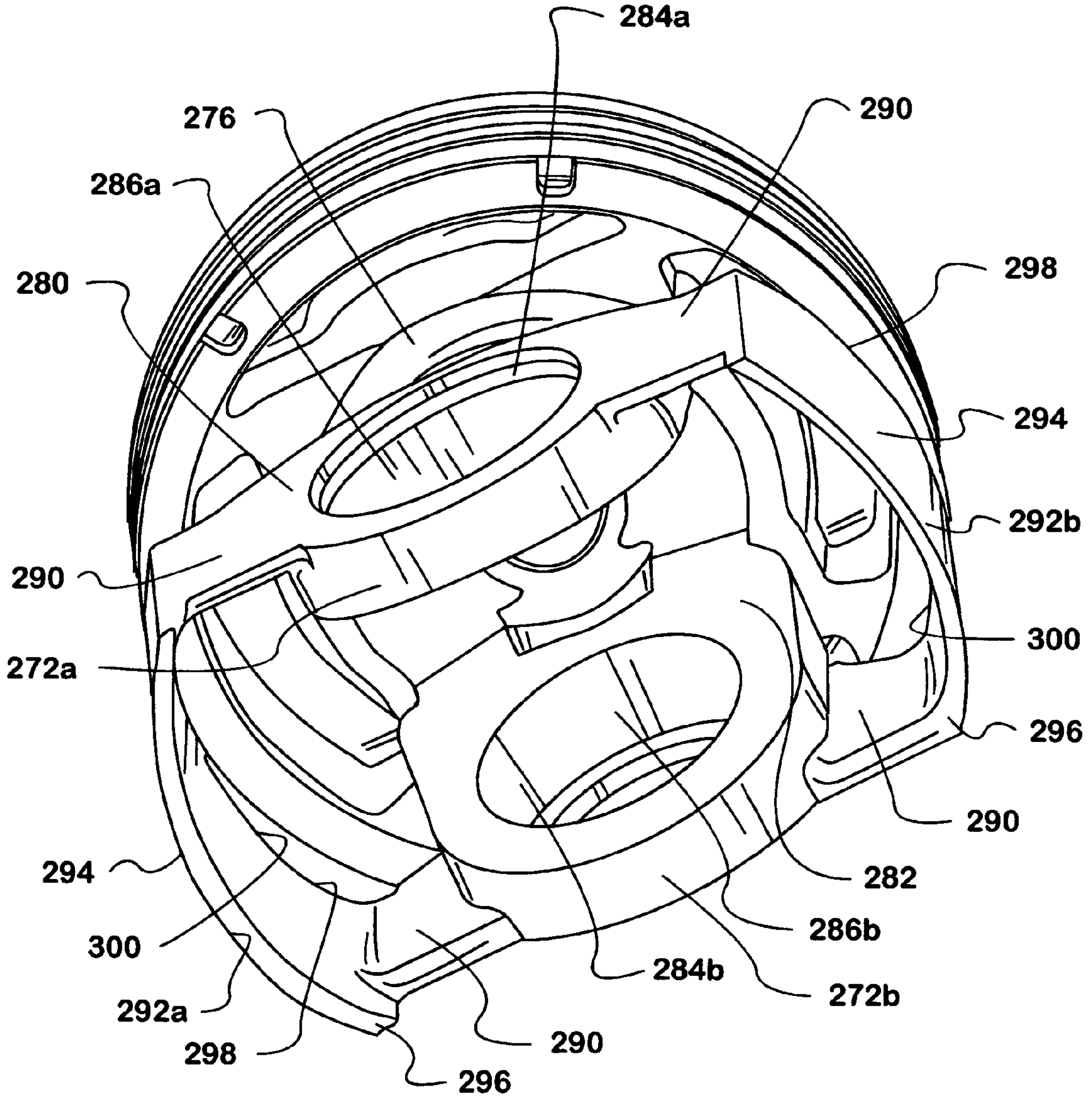
FIG. 2 is a perspective undercrown view of the piston of FIG. 1.

The piston of the present invention is shown generally at 10 in FIGS. 1 and 2. The piston 10 of the present invention has two major subcomponents: crown assembly 250 and skirt assembly 252.

The crown assembly 250 of the piston 10 presents a top margin 254. At least a partial combustion chamber (bowl) 256 is defined in the top margin (crown surface) 254. The combustion chamber 256 is preferably centrally defined in the piston 10 such that a central axis of the combustion chamber 256 is coincident with a central axis of the piston 10. Valve clearance (pockets not shown) may be forged into the combustion chamber 256, as desired. Additionally, secondary machining may be employed after the forging of the piston 10 in order to define the desired combustion chamber 256.

An exemplary combustion chamber 256 preferably has an annular reentrant surface 258. The annular reentrant surface 258 preferably smoothly transitions to an annular or spherical side margin 260. The side margin 260 in turn preferably smoothly transitions to an annular or spherical bottom margin 262. A center post 264, which is preferably spherical, is smoothly joined to the bottom margin 262.

The crown assembly 250 includes a side margin 268. As forged, the side margin 268 may be smooth. A plurality of grooves including compression ring grooves 270 and wiper ring groove 272 are depicted formed in the side margin 268. It is understood that secondary machining after forging of the piston 10 may be necessary to form the compression ring grooves 270 and wiper ring groove 272. A plurality of oil passages 274 are formed in the bottom margin of the wiper ring groove 272 to return lubricating oil to the engine oil sump.

A web 276 is formed on the undercrown of the piston 10. The web 276 is preferably a depending structure that couples the crown assembly 250 to the skirt assembly 252.

The skirt assembly 252 includes a pair of pin bosses 278*a, b*, each pin boss 278 depending from the web 276. Each of the pin bosses 278*a, b* has a substantially planar outer margin 280 and an inclined inner margin 282. The inclined inner margin 282 is thicker at the point of juncture with the web 276 than at the lower margin of the respective pin bosses 278*a, b*.

A pair of pin bores 284*a, b* are in registry and are defined through the respective pin bosses 278*a, b*. The inner margin of the respective pin bores 284*a, b* may be formed of as bearing 286*a, b*. It is understood that the bearing 286*a, b* may simply be a surface formed of the same material as the rest of the piston 10. Alternatively, the bearing 286*a, b* could be separately formed of a different material and affixed in the respective pin bores 284*a, b* as by pressing or the like. Such a process is described in greater detail below. Alternatively, a different material may be injected during the powder forging process in the vicinity of the bearings 286*a, b* and forged therein at the same time as the forging of the remainder of the piston 10. Such a process is also described in greater detail below.

Planar lateral extensions 290*a, b* extend outward from the respective pin bosses 278*a, b* on both sides of the respective pin bosses 278*a, b*. Accordingly, there are four planar lateral extensions 290. Two semicircular skirts 292*a, b* are formed integral with the outer margin of a respective parallel pair of the planar lateral extensions 290.

Each of the semicircular skirts 292*a, b* presents a skirt outer margin 294 that has a radius that is generally equal to the radius of the crown assembly 250 of the piston 10. As such, the skirt outer margin 294 presents a bearing surface riding on the inner margin of the cylinder in which the piston 10 is translationally disposed.

Each of the skirt outer margins 294 has a depending skirt lip 296.

Each of the skirt outer margins 294 presents a skirt upper margin 298. The upper skirt margin 298 defines in part a lightening void 300 that is defined between the undercrown portion of the crown assembly 250 and the skirt assembly 252.

Figure 3:
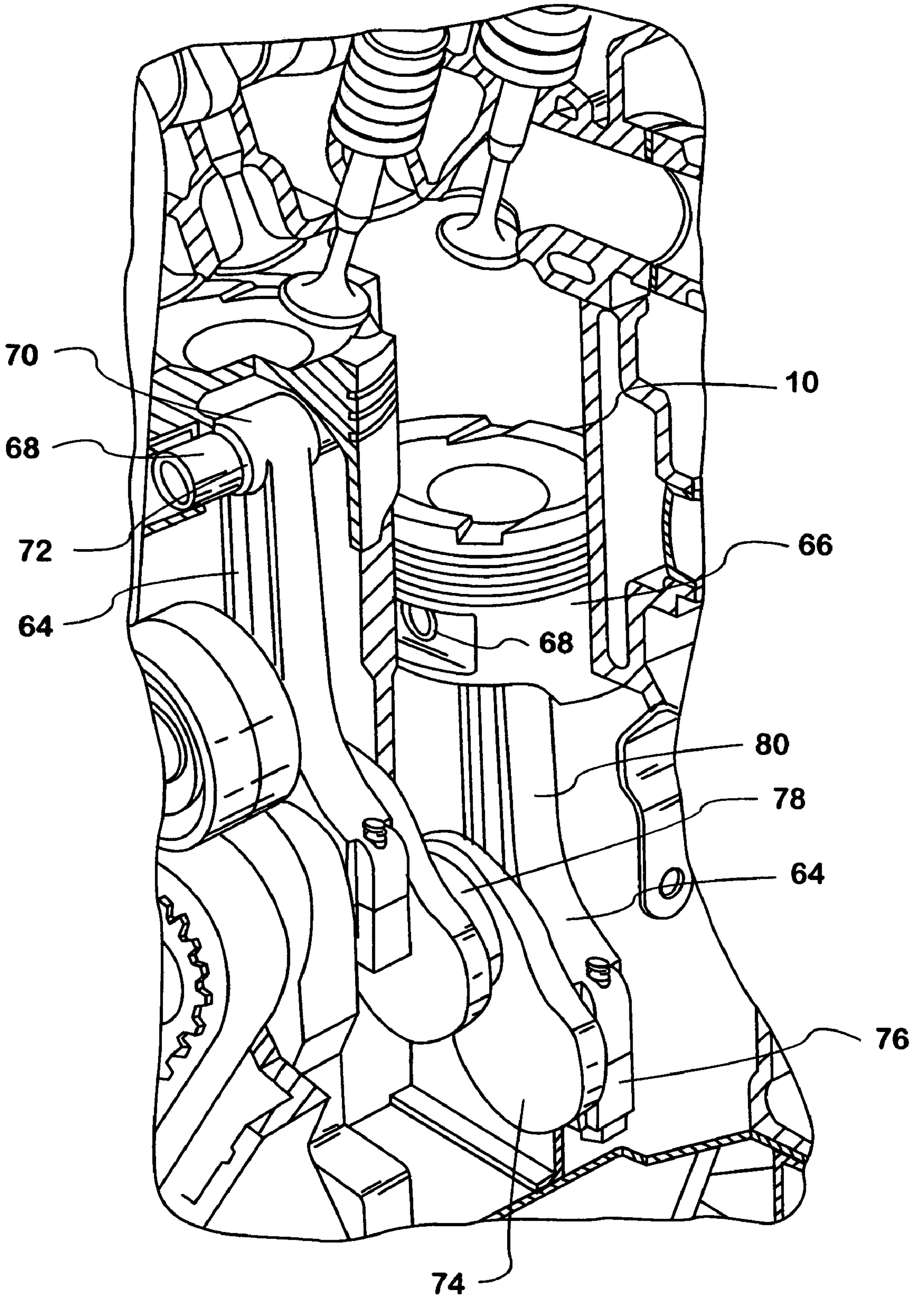
FIG. 3 is a partial cutaway perspective view of a vehicular engine including an exemplary embodiment of a piston made in accordance with the present invention.

FIG. 3 illustrates the internal detail of a conventional internal combustion engine to illustrate the use of the piston 10. Connecting rod 64 is pivotally connected to the piston 10 and to the crankshaft 74. The connecting rod 64 is connected to the crankshaft 74 at a large or crank end 76. The large end 76 of the rod 64 receives a shaft portion ("crank pin") 78 of the crankshaft 74. The connecting rod 64 is further connected to the piston 10 at a small or piston end 70 of the rod 64. A pin ("wristpin") 68 is used to rotatably secure the small end 70 of the connecting rod 64 within the skirt portion of the piston 66.

Figure 4:
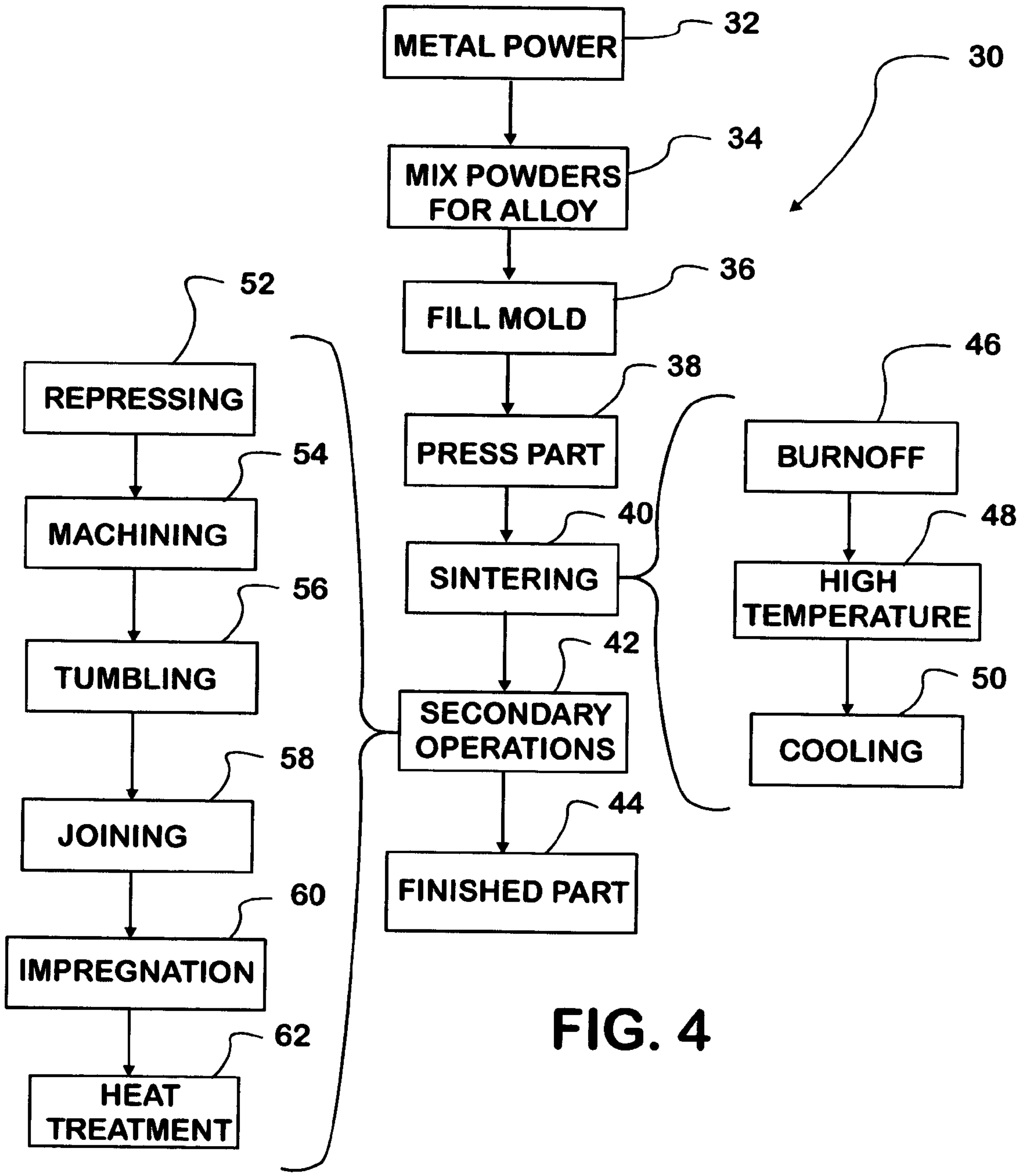
FIG. 4 is a process flowchart for a powder metallurgy manufacturing process for forming the piston of FIG. 1.

Referring to FIG. 4, a process chart for a powder metallurgical component forming process 30 is shown that is suitable to form a homogeneous embodiment of the piston 10. First, the metal powders 32 that will comprise the component (piston 10 of the present invention) are provided. Often, lubricants are added to the metal powders to decrease the wear of pressing machinery. Next, the base powders are mixed 34 to form a homogenous mixture. The finished piston 10 will ultimately be a homogeneous alloy of the constituent metal powders.

A mold or die is then filled 36 with the mixed powders. The die, when closed, has an internal cavity in the same shape as the final part, piston 10. The powder is compressed 38 within the die to form a so-called "green part", which has the substantially the shape of the finished piston 10. The compaction 38 is usually performed at room temperature and at pressures in the range of 30–50 tons per square inch. The green part, also referred to as a "green compact," has the desired size and shape of the finished piston 10 when ejected from the die. After compaction 38, the green part has sufficient strength for further processing.

Next, the green part is subjected to a sintering process 40. Generally, sintering 40 involves subjecting the green part to a temperature of 70–90% of the melting point of the metal or alloy comprising the green part. The variables of temperature, time and atmosphere are controlled in the furnace to produce a sintered part having improved strength due to bonding or alloying of the metal particles. The sintering process 40 most generally comprises three basic steps conducted in a sintering furnace: (a) burnoff 46; (b) sinter 48; and (c) cooling 50. Continuous-type sintering furnaces are commonly used to perform these steps. Burnoff 46 is performed in a burnoff chamber and is used to volatize the lubricants used in forming green part 10. A high-temperature chamber performs the actual sintering 48. The cooling chamber performs the cooling 50 and cools the sintered part 10 prior to handling.

The pistons 10 that exit the sintering furnace 40 after cooling 50 may be considered complete. Alternatively, they may undergo one or more secondary operations 42. Exemplary secondary operations include re-pressing the component 52, machining 54, tumbling 56 and joining the component with additional components 58 as part of an overall assembly. The secondary operations 42 may also include the impregnation of oils or lubricants 60 into the part for conveying self-lubricating properties. The sintered component may also undergo heat treatment 62 to provide certain characteristics and properties to the component, such as strength. Those skilled in the art will recognize that other secondary operations may be performed. The secondary operations 42 may be performed individually or in combination with other secondary operations.

After sintering 40, a variety of secondary operations 42 may be performed on the part depending its intended use. It is understood that the bearings 286*a, b* may be formed of the homogenous material forming the remainder of the piston 10, However, a separate component defining a bearing 286*a, b* may be disposed in the wrist pin aperture bore 284*a, b* of FIGS. 1 and 2 by pressing into the pin bore 284*a, b*. The bearing 286*a, b* may be formed of bronze or other material suitable to provide the rotating contact with the wrist pin 68. In certain uses, the material forming the bearing may advantageously be a different material than that forming the remainder of the piston 10. Finally, the finished piston 10 is ready for employment.

Figure 5:
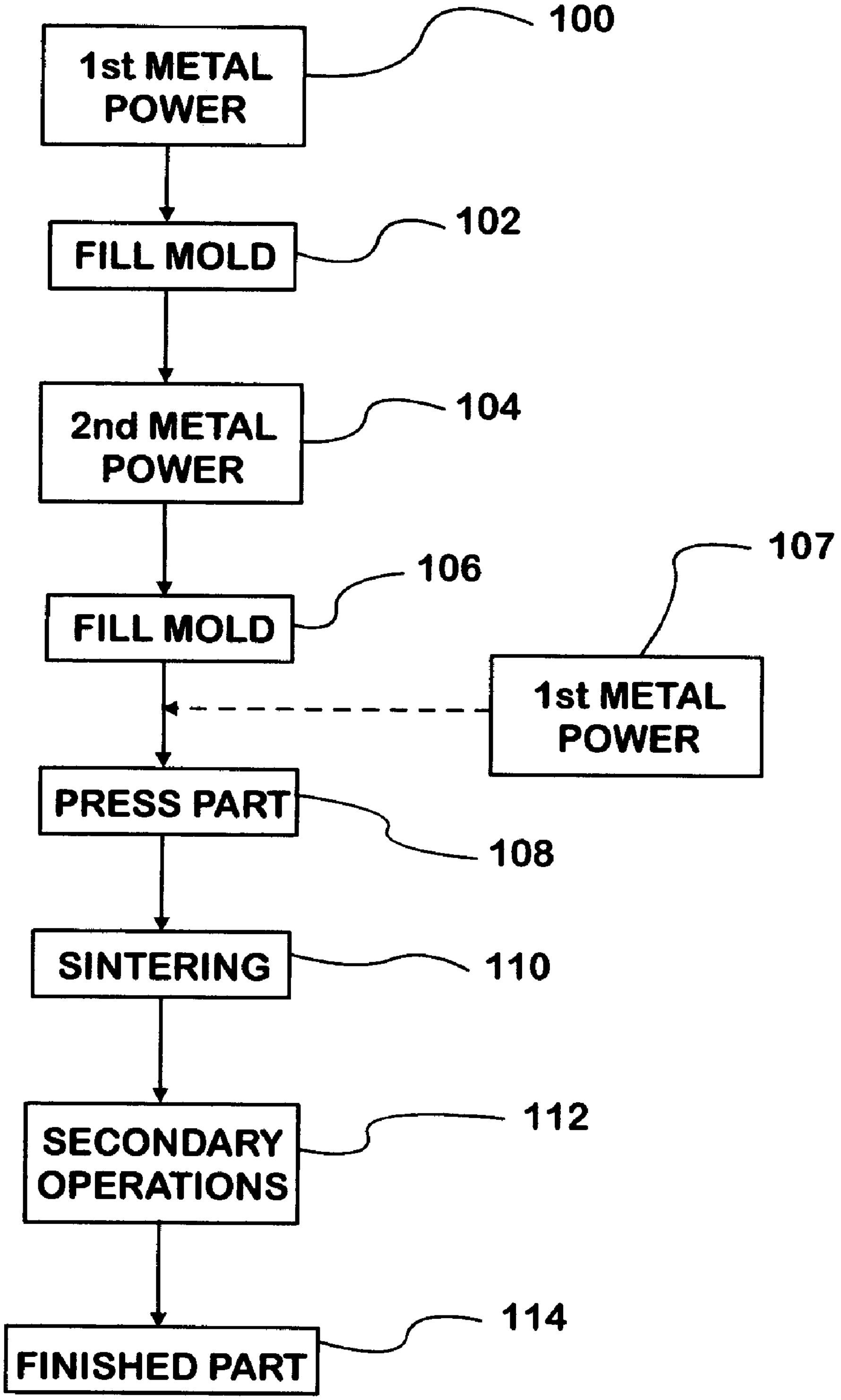
FIG. 5 is a process flowchart for fabricating a non-homogenous component using the powder metallurgy manufacturing process according to an embodiment of the present invention.

FIG. 5 illustrates the process for manufacturing a non-homogenous powder metallurgical manufactured piston 10. A first metal powder 100 is provided to a mold 102. Then, a second metal powder 104 is provided to the mold 106. The powder in the mold 106 is next pressed 108 to form a green part comprising the piston 10. The green part 10 is then sintered 110 before performing one or more secondary operations 112. After the green part 10 is sintered 110 and all secondary operations 112 performed, the part is then finished 114. This process may be modified as shown in step 107 by providing a first metal powder to the mold following the provision of the second metal powder 104 to the mold 106. Those skilled in the art will recognize that additional layering of powdered metals may be performed without deviating from the spirit and scope of the present invention.

The above procedure is performed to provide a piston 10 with dissimilar characteristics at discrete locations in the piston 10. For example, the piston 10 may be provided with a unitary layer of material forming the bearings 286*a, b* by way of the forming operation. The method of manufacturing the piston 10 by the present method allows the secondary step of separately forming and providing wrist pin bearings 286*a, b* to be eliminated, thereby saving cost, time, and complexity. The bearing 286*a, b* is instead formed integrally during the powder forging process, as described in greater detail below.

Figure 7:
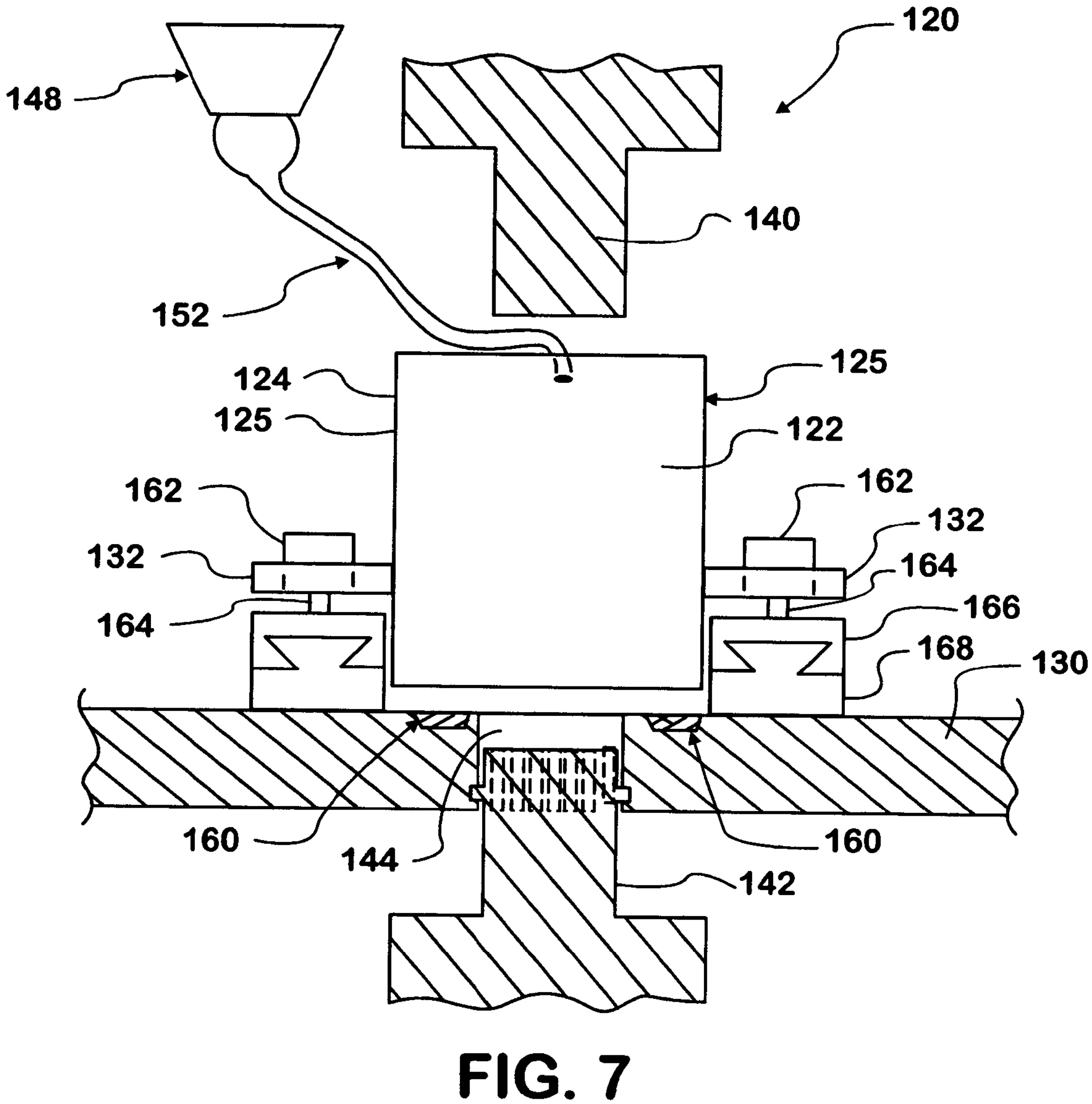
FIG. 7 is a front view of a green part forming apparatus according to an embodiment of the present invention.

Referring to FIG. 7, a green component forming apparatus 120 according to an embodiment of the present invention is shown. The green part forming apparatus 120 may be referred to generally as a feedshoe apparatus 120. The feedshoe apparatus 120 most generally comprises a powder filling vessel 122 actuatable by an actuator cylinder 134, an upper punch 140, a lower punch 142, and a powder hopper 148. More particularly, a first vessel 122 is rigidly connected to a second vessel 126 by one or more connection members 138. The second vessel 126 is connected to an actuator cylinder 134 via a piston 136. The actuator cylinder 134 may be a hydraulic or pneumatic cylinder for urging the piston 136 in or out, thereby guiding first 124 and second 125 vessels in a linearly controlled movement. Each vessel 124, 126 comprises side walls 125 defining an interior cavity 124, 128 therein. The side walls 125 have sloped portions 129 for directing powder towards a powder outlet valve 146. A top opening 127 in the vessel 122, 126 is sized to receive a chute 152, 154 connected to hopper 148, 150. The hoppers 148, 150 are for receiving a respective first and second powdered metal that will be provided to a respective first interior cavity 124 and second interior cavity 128. The first chute 152 and second chute 154 comprise a flexible tube configured to allow for the linear movement of the first vessel 122 and second vessel 126. Both first and second vessels 122, 126 move linearly by sliding on bridge member 132. Each of the bridge member 132 and actuator cylinder 134 are mounted on a die table 130.

Referring to FIG. 7, a side view of the feedshoe apparatus 120 is depicted. One or more locking mechanisms 160 are provided to the die table 130. The locking mechanisms 160 allow for registration of the vessels 122, 126 during a die cavity 144 filling operation. The locking mechanism 160 may be a magnet or other locking means such as a male-female socket or equivalent thereto.

The bridge member 132 is slidably disposed on the guides 166. Each guide 166 is further disposed upon a rail 168. An elevation cylinder 162 is disposed on each bridge member 132 and configured to elevate the bridge member 132 above the guides 166 by extension of an elevation piston 154. The separation shown in FIG. 2 between the first vessel 122 and the die cavity 144 allows the actuator cylinder 162 to move the vessel 122 transverse to the cavity 144. The vessels 122, 126 must be moved away from the punches 140, 142 to a distance that will not interfere with the pressing process.

Figure 8:
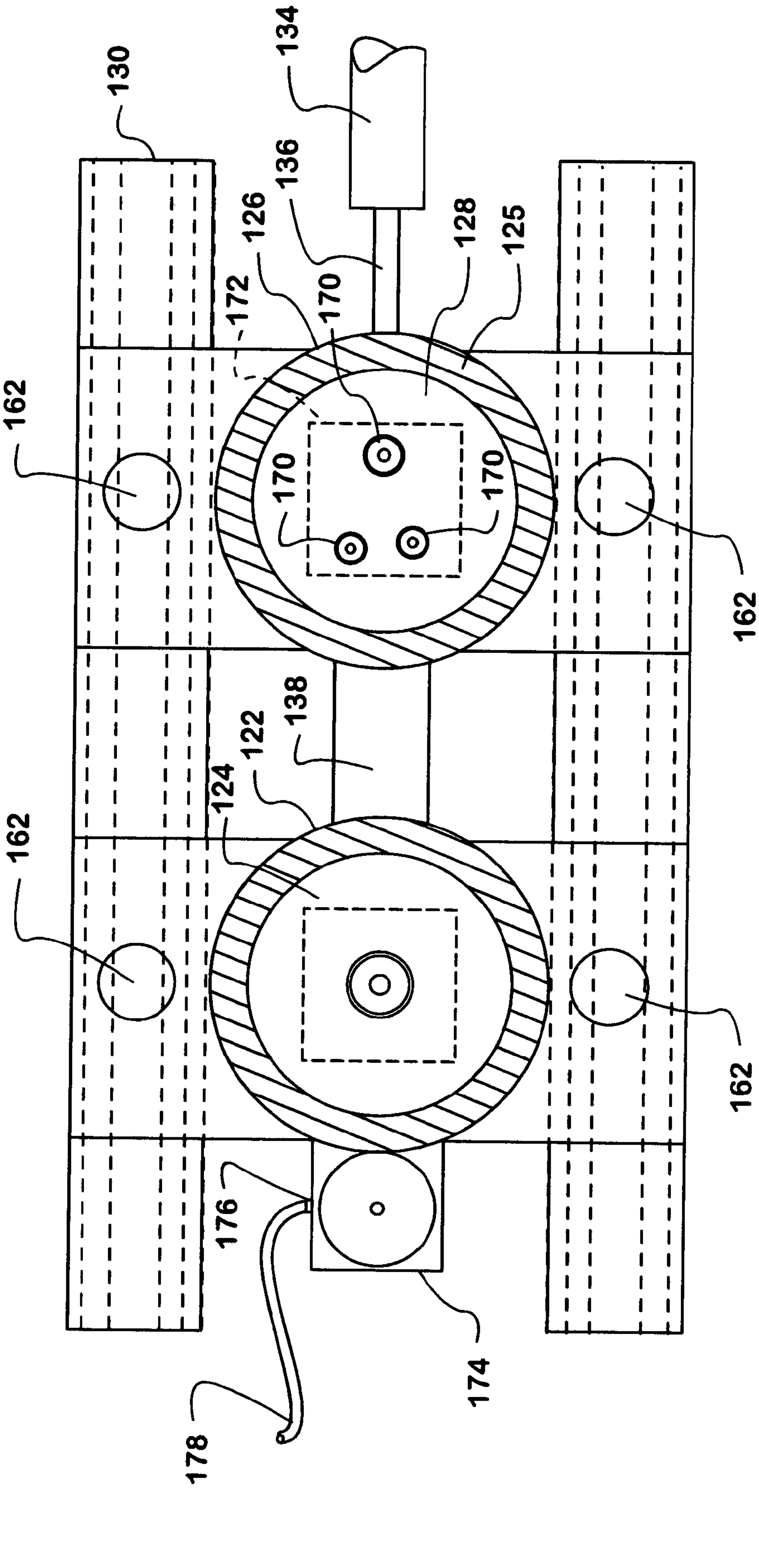
FIG. 8 is a top view of a green part forming apparatus according to an embodiment of the present invention.

Referring to FIG. 8, a top view of the feed shoe apparatus 120 is shown. Each vessel 122, 126 is depicted in a partial cutaway to illustrate interior detail. A dashed outline of the die cavity perimeter 172 is shown for reference purposes. One or more powder egresses 170 are disposed in the bottom surface of each vessel 122, 126. The powder egresses 170 include the valves 148 for controlling the passing of the powder metal into the die cavity 144. The egresses 170 may be sized to control the relative amount of flow through a particular egress 170 during a filling operation. The first vessel 122 is shown with a single egress 170. The second vessel 126 is shown as having three egresses 170 with differing sizes. Various polygonal or eccentric shapes or varying size may be employed in place of the circular-shaped egresses without departing from the scope of the present invention.

The size and placement of the powder egresses 170 are carefully chosen to correspond with the provision of predetermined characteristics for the finished part. For example, the piston 10 in an internal combustion engine needs to include a bearing race 286*a, b* as part of the pin bores 284*a, b*. As noted above, the method for manufacturing the piston 10 is to provide separately formed bearings 286*a, b* to the preformed piston 10 as part of a secondary operation. The apparatus and method disclosed herein provides for a powder egress positioned at the precise location for the bearing race 286*a, b* portion of the piston 10.

The feedshoe apparatus shown in FIG. 8 additionally includes a liquid injection apparatus 174. The liquid injection apparatus 174 injects liquids to the first interior cavity 124 during a forming process. An inlet to the injection apparatus 176 is connected to a liquid conduit 178, which supplies a liquid solution. The apparatus may comprise a solenoid valve, such as a zero dead leg volume solenoid valve. However, a variety of suitable dripless valves may be used without departing from the scope of the present invention. Those of skill in the art will recognize that the present invention may also be practiced with a second liquid injection apparatus provided to the second vessel, or alternatively, one liquid injection apparatus in communication with both of the first and second vessels.

The liquid solution may include aqueous solutions, lubricants, surfactants, or activation solutions for cleaning metal particulates for cold welding. The liquid solution may also include any solution that is intended to be incorporated into the material, such as a hardener, or solvent. The injection of lubricants may be employed to reduce wear to the die cavity of the apparatus.

Figure 9:
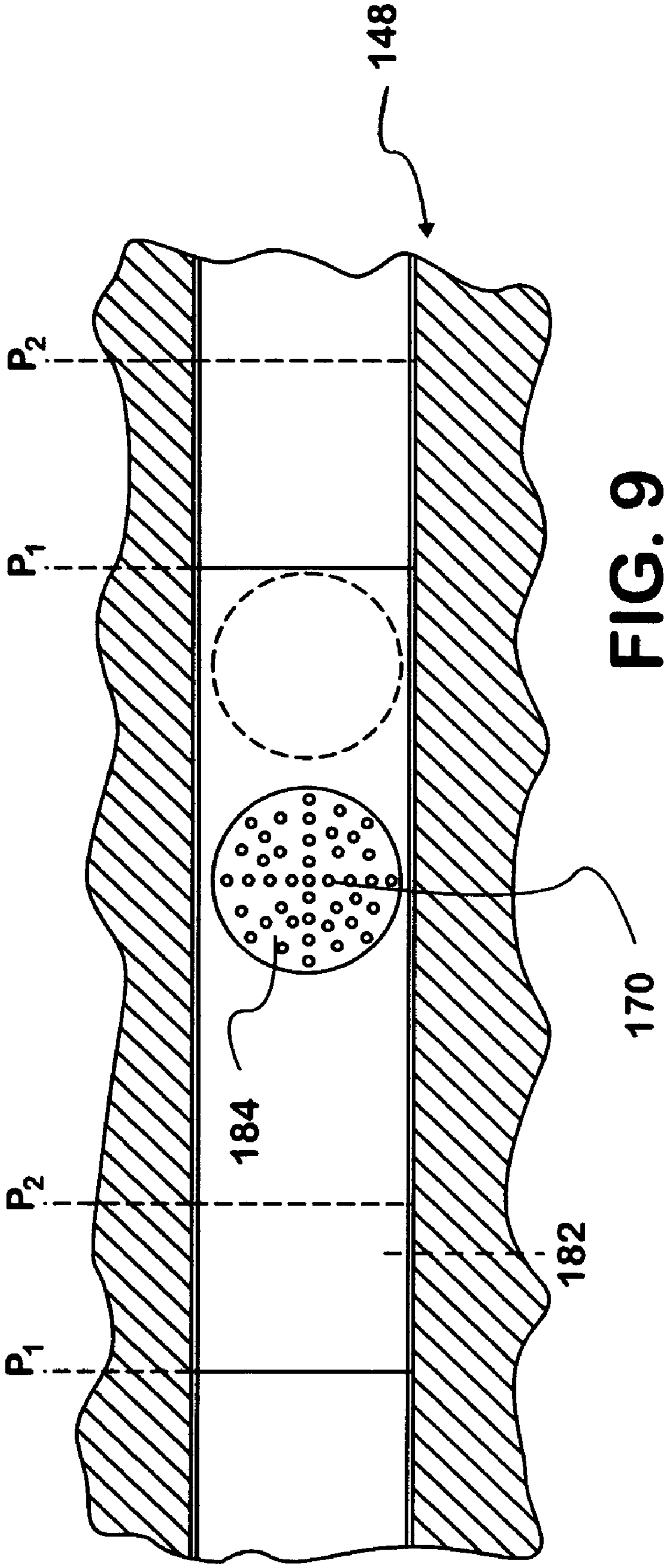
FIG. 9 is a partial top cutaway detailed view of a feed valve for a green part forming apparatus according to an embodiment of the present invention.

FIG. 9 illustrates a valve assembly 148 that comprises the powder egress 170 of the vessel 122, 126. A housing surface 182 in conjunction with slide hole 124 define an open position $P_1$ and a closed position $P_2$ for the powder egress 170. The slide hole 184 moves between positions $P_1$ and $P_2$ as the actuator 134 linearly translates the vessel 122, 126. The open condition permits metal powder to freely exit the vessel and enter the die cavity. The closed position blocks the transfer of powder to the cavity. Other methods or devices for cutting off the flow of powder from the feedshoe to the die cavity may utilized without departing from the scope of the present invention.

Figure 10:
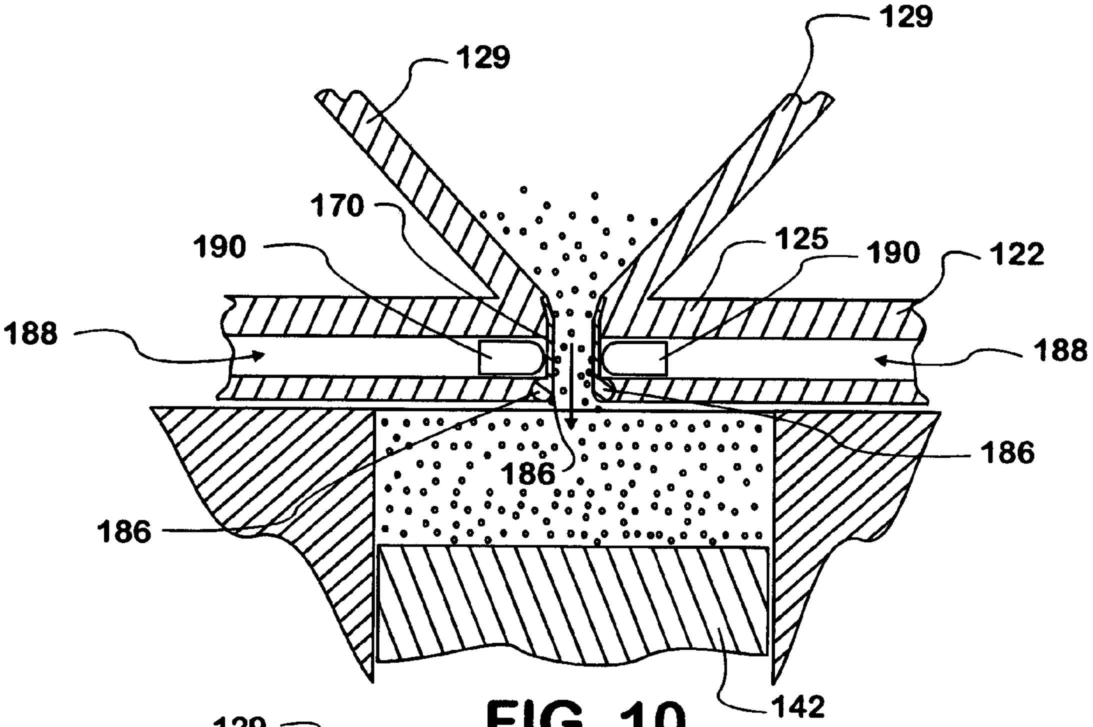
FIG. 10 is a partial cutaway side detailed view of a powder egress in the open position according to an embodiment of the present invention.
Figure 11:
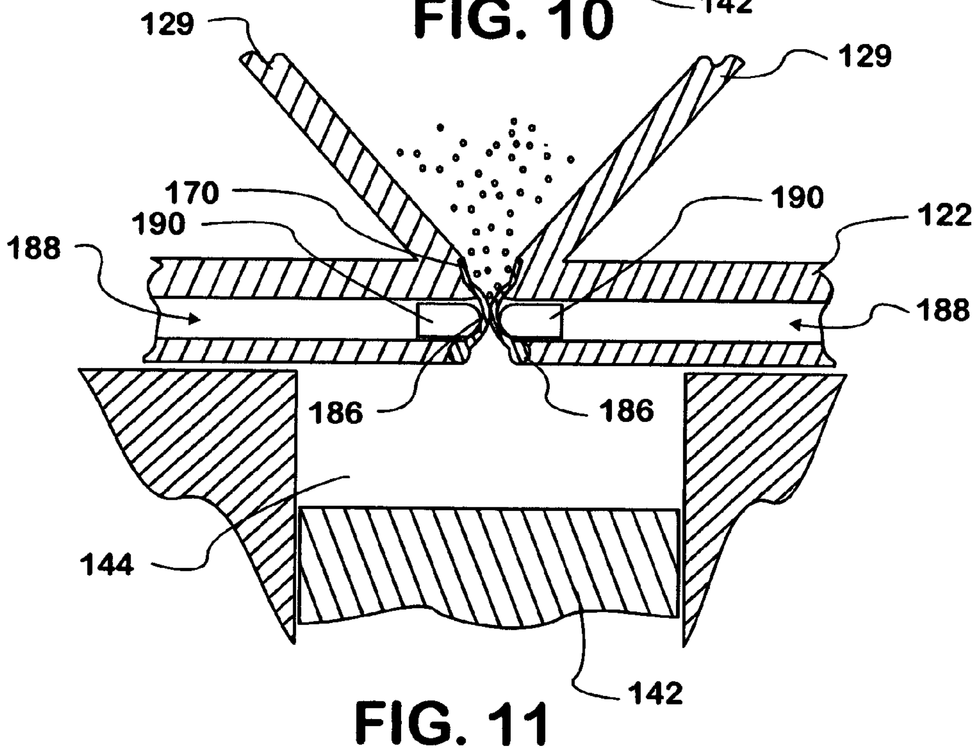
FIG. 11 is a partial cutaway side detailed view of a powder egress in the closed position according to an embodiment of the present invention.

Referring to FIGS. 10 and 11, depict an alternative embodiment of an apparatus and method for controlling the flow of metal powder into the die cavity 144. A feedtube 186 communicates between the interior cavity 124, 128 of the vessel 122, 126 and the die cavity 144. The feedtube 186 is comprised of a flexible material, such as rubber. The bottom sidewall of the vessel 122, 126 defines a channel 188 therein as shown in the figures. A pincher or crimper device 190 is disposed within the channel 188. The feedtube 186 is in the open position, as shown in FIG. 10, when the crimping devices 190 are withdrawn or not pressing on the tube 186. FIG. 11 shows the tube 186 in a closed position wherein the crimping devices 190 press on the tube sidewalls until the sidewalls contact, thereby blocking powder flow. The crimpers 190 are urged towards the feedtube 186 by way of pneumatic control. High pressure is presented to the channel 188, which urges the crimpers 190 towards the tube 186. The removal of this high pressure condition causes the natural resiliency of the tube 186 to re-open, thereby permitting powder flow. Mechanical means, such as a linkage, may be used instead of the pneumatic drive means without departing from the intended scope of the present invention.

Figure 6:
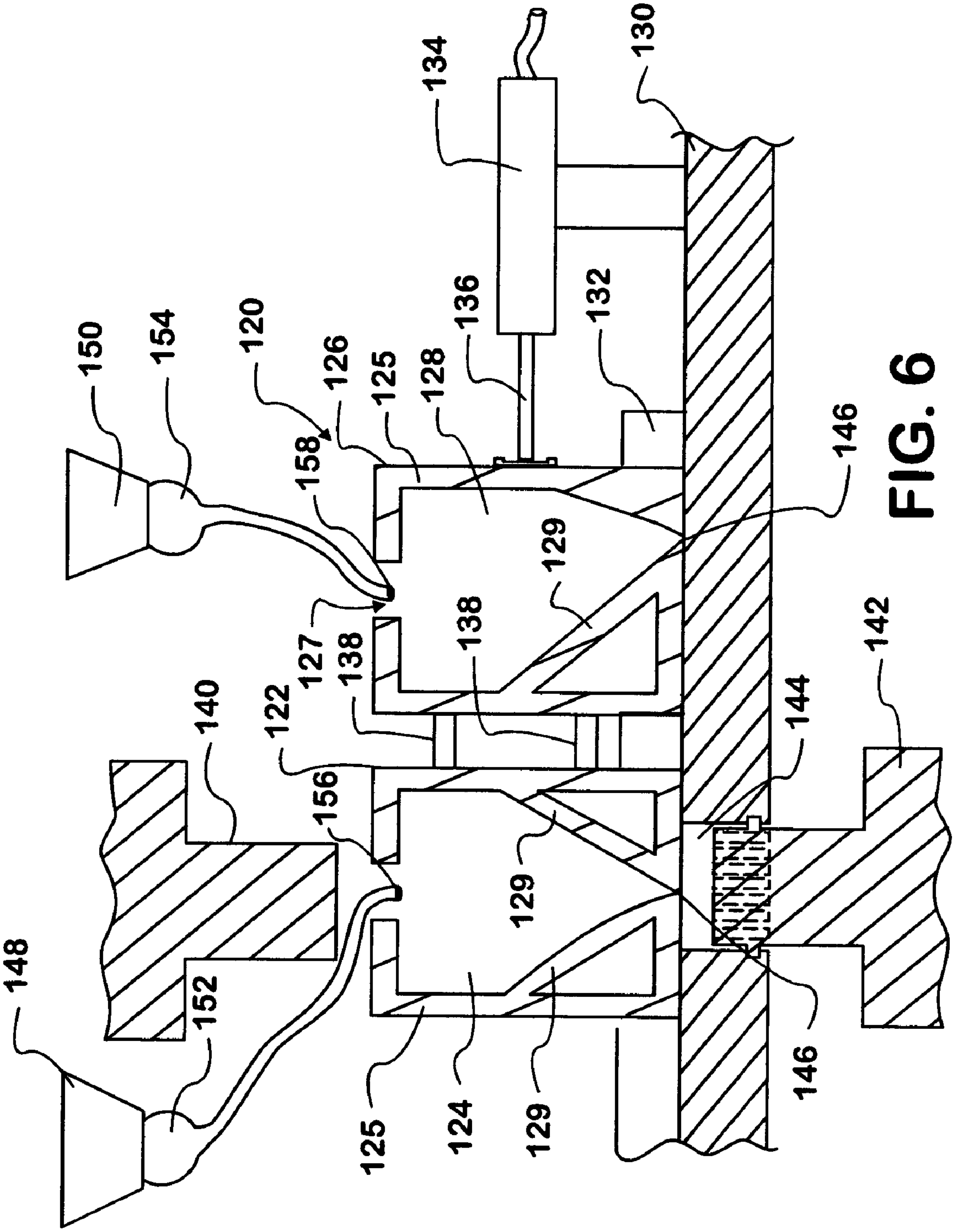
FIG. 6 is a side cutaway view of the green part forming apparatus according to an embodiment of the present invention.

Referring to FIGS. 6–8, the method and apparatus for manufacturing a non-homogeneous article with powder metallurgy will be described in operation. The following description is more particularly directed towards manufacturing a piston 10 for an internal combustion engine wherein the piston 10 has unitary bearing material formed as bearing 296*a, b* as part of a single forming procedure. A first metal powder, such as steel, is placed in the first hopper 148 and a second metal powder, such as bronze, is placed in a second hopper 150. The first vessel 122 is also centered over the die cavity 144 by either expanding or retracting the piston 136 of the actuator cylinder 134 as necessary.

Then the first metal powder is introduced to the first interior cavity 124. The first powder then fills the mold or die cavity 144 through the powder egress 170 with a predetermined amount of powder. The flow of first powder is stopped by the valve 148 at the powder egress 170. The piston 136 is next extended until the second vessel 126 centers over the die cavity 144. Note that the powder egress 170 is not centered over the die cavity 144. This allows the second powder to deposit at the discreet location needed to form the bearings 286*a, b* of the finished piston 10. A predetermined amount of the second powder is then filled into the die cavity 144. The first and second powder fill operations are then repeated until the cavity 144 is filled with a sufficient amount of metal powder to form a finished part.

The piston 136 is next retracted until the first vessel 122 is clear of the upper 140 and lower 142 punches. Then the powder in the die cavity 144 is pressed to form a green part (piston 10) once the clearance has been established. The green part is next placed in a sintering oven and cooled. Once cool, the sintered piston 10 is machined to final tolerances. Other secondary operations, such as carburizing nitriding, or machining, may be performed without departing from the scope of the present invention. It is not necessary to provide the piston 10 with a separately formed bearing as part of a secondary operation due to the bearing 286*a, b* being provided as part of the forming operation. A finished connecting piston 10 results from the completion of any other required secondary operations.

Figure 12:
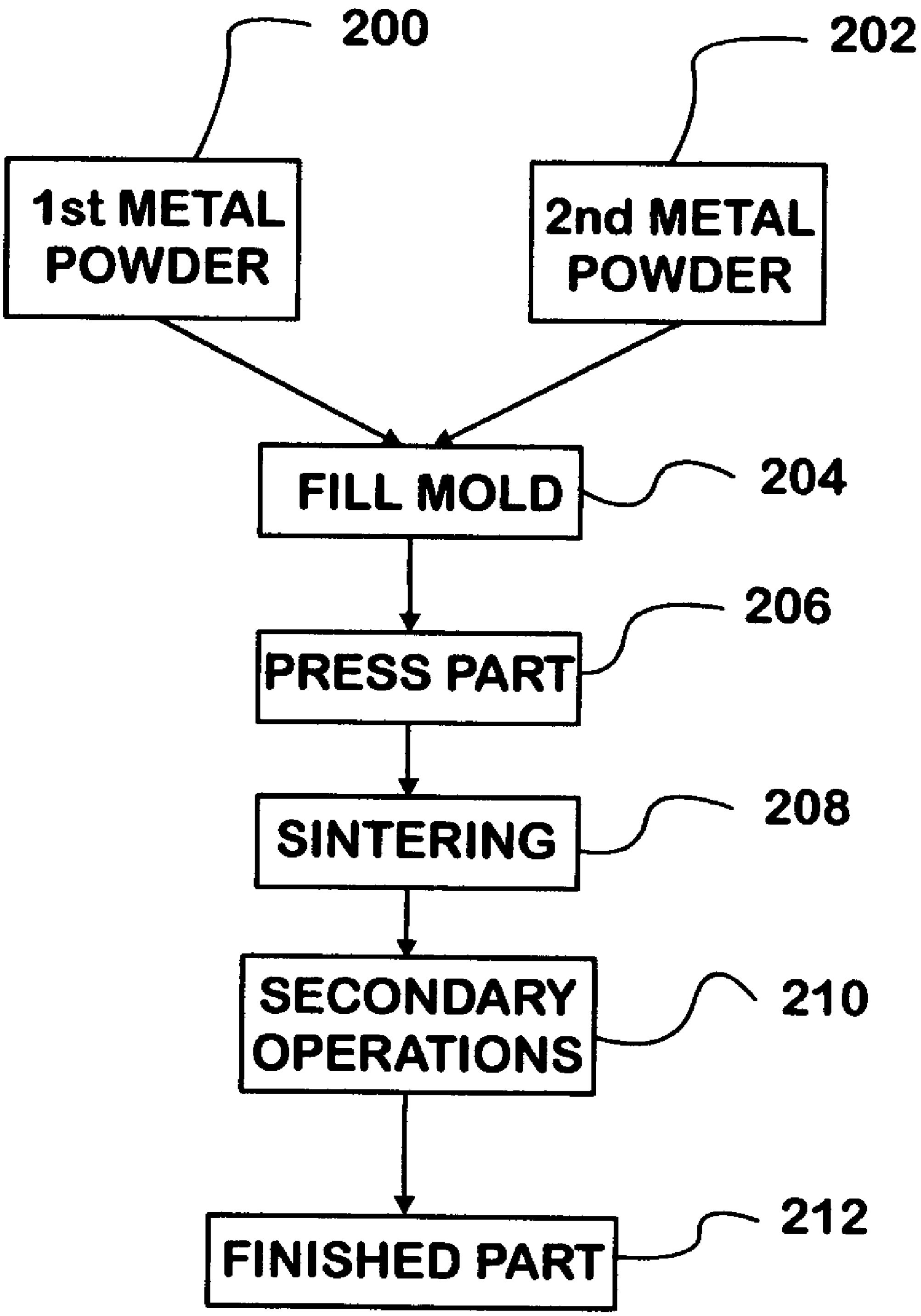
FIG. 12 is a process flowchart for fabricating a non-homogenous component using the powder metallurgy manufacturing process according to an embodiment of the present invention.

Referring to FIG. 12, an alternative method of manufacturing a non-homogenous piston 10 with an integral bearing 286*a, b* is shown. Each of the first metal powder 200 and second metal powder 202 is filled in the mold or cavity simultaneously 204. Then the part is pressed 206, sintered 208 and subjected to secondary operations 210 before it is finished 212.

Figure 13:
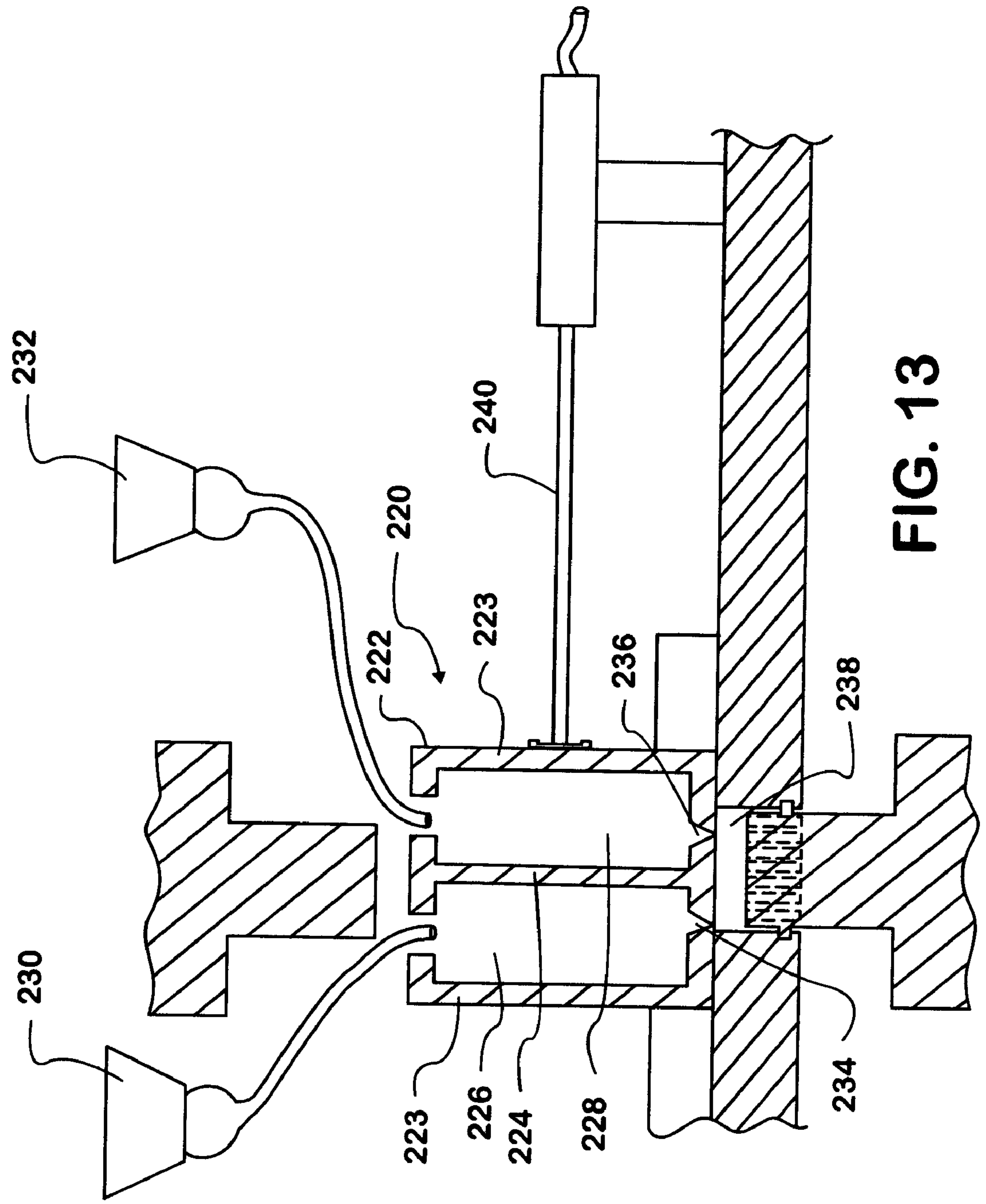
FIG. 13 is a side cutaway view of the green part forming apparatus according to an embodiment of the present invention.

FIG. 13 depicts an alternative apparatus for forming a green part (piston 10) according to either the method described in FIG. 5 or FIG. 12. The feedshoe apparatus according to this embodiment comprises a single vessel 222. The vessel 222 comprises sidewalls 223 and a center divider 224. The sidewalls 223 and center divider 224 define a first section or chamber 226, and a second section or chamber 228. The first section 226 receives a first metal powder from a first hopper 230 and the second section 228 receives a second metal powder from a second hopper 232. A first powder egress 234 is provided to the first chamber 226 and a second powder egress 226 is provided to the second chamber 228.

In operation, the first and second powders may be provided to the die cavity at the same time. The respective powder egresses 234, 236 are located and sized to promote the filling of the cavity 238 with the first and second powders in their desired locations before pressing. Alternatively, the piston 240 may move the vessel 222 in a linear direction to place a respective first 234 or second 236 egress over a portion of the die cavity 238 prior to filling with a metal powder. As a further alternative, the powder egresses 234, 236 may be selectively opened and closed to create density gradients in the part or to further place a second material within the first. Additionally, a combination of the above alternatives may be employed as part of the same forming operation.

Figure 14:
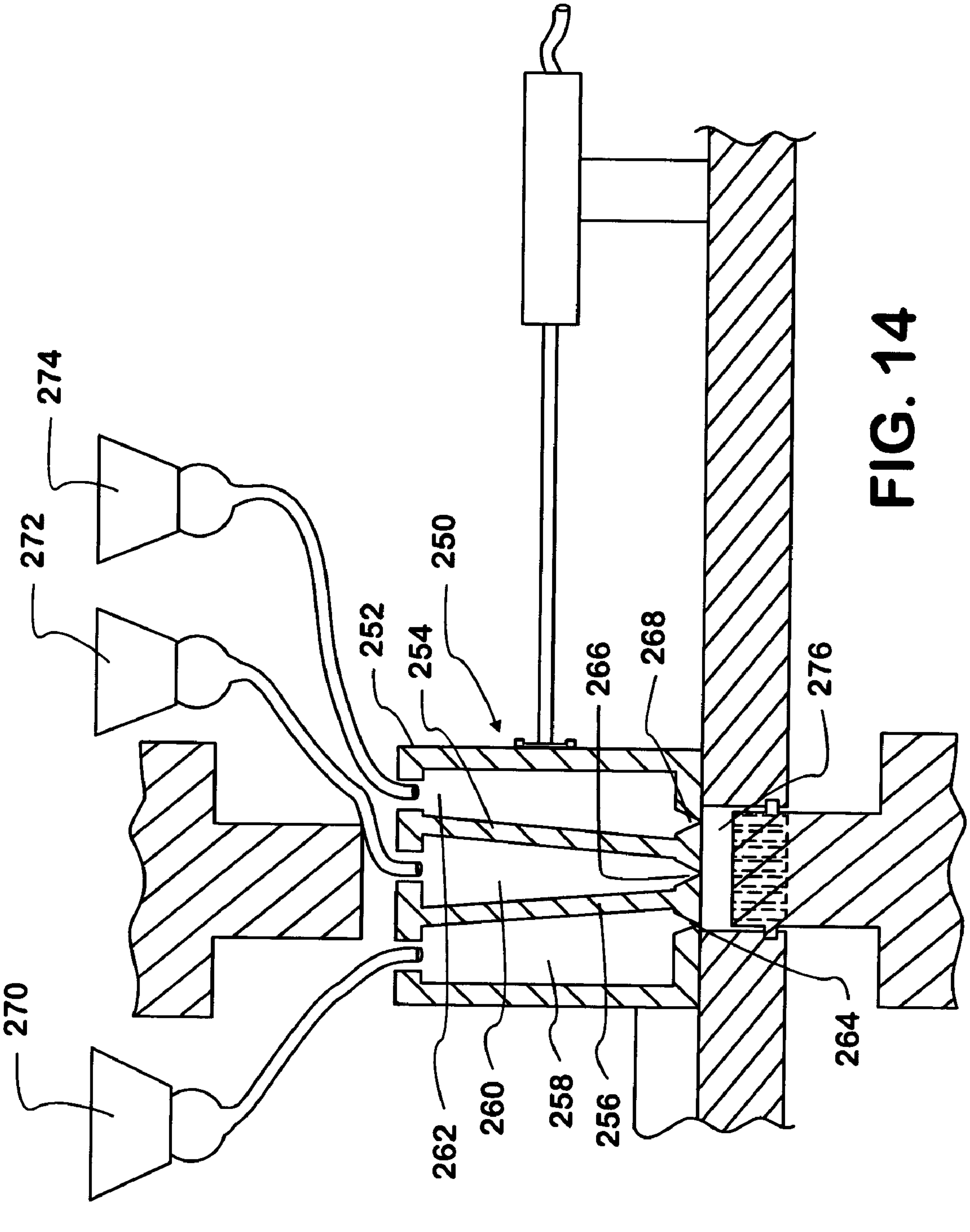
FIG. 14 is a side cutaway view of the green part forming apparatus according to an embodiment of the present invention.

FIG. 14 depicts another alternative embodiment of the green part forming (feedshoe) apparatus 250. This embodiment again comprises a single vessel 252. The vessel comprises first 256 and second 254 dividers for defining a first chamber or section 258, a second chamber 260 and a third chamber 262. Each chamber 258, 260 and 262 receives a respective first 264, second 266 or third 268 powder egress and is in communication with a respective first 270, second 272 or third 274 hopper. Those having skill in the art will appreciate that the present invention may be practiced with more than three chambers without departing from the scope of the present invention. Moreover, a single hopper may be in communication with two or more chambers.

The use of three chambers 258, 260 and 262 allows a first of two different powders to be presented to the die cavity 276 in two places simultaneously. Alternatively the three chambers 258, 260 and 262 allow three powders to be introduced to the die cavity 276 as part of a single forming operation. The embodiment of FIG. 14 is operated in substantially the same manner as set forth above for the two-chamber embodiment.

Although the present invention has been described with reference to the preferred embodiments, workers skilled in the art will recognize changes may be made in form and detail without departing from the spirit and scope of the invention.

What is claimed is:

1. A method of forming a piston, comprising:

executing a powder metallurgy process on at least one metallic constituent to form an integral, unitary piston structure without at recourse to subsequent shaping under heat and pressure, the piston structure having a crown assembly and a skirt assembly, at least a partial combustion chamber being formed intersecting a piston crown surface during the powder metallurgy process, the skirt assembly depending from the crown assembly and having two spaced apart pin bosses, each pin boss having a pin bore defined therein, a pair of opposed semi-circular skirt members, each skirt member extending outwardly from and being integrally joined to both of the pin bosses.

2. The method of claim 1, the process fanning a homogenous piston structure.

3. The method of claim 1, including executing a powder metallurgy process on at least two different metallic constituents to form a non-homogenous piston structure.

4. The method of claim 3 including providing dissimilar characteristics at discrete locations of the structure by selective relative dispositions of the at least two different metallic constituents.

5. The method of claim 4 including presenting a bearing surface for rotatably supporting a wrist pin by a one of the at least two different metallic constituents.

6. The method of claim 3 including:

filling a first portion of a mold with a first metal powder;

filling a second portion of the mold with a second metal;

applying pressure to the metal powder in the mold; and sintering the metal powder in the mold.

7. The method of claim 6 one of the first and second portions of the mold presenting a bearing surface for rotatably supporting a wrist pin.

* * * * *